INVENTOR
DOUGLAS A. VENN
BY [signature]
ATTORNEY

Nov. 20, 1962 D. A. VENN 3,065,430

WIDE RANGE FREQUENCY AND PHASE CONTROL SYSTEM

Filed Jan. 28, 1960 2 Sheets-Sheet 2

*INVENTOR*
DOUGLAS A. VENN.

BY Richard C. Reed

ATTORNEY 3,065,430
Patented Nov. 20, 1962

3,065,430
WIDE RANGE FREQUENCY AND PHASE CONTROL SYSTEM

Douglas A. Venn, Suitland, Md., assignor to the United States of America as represented by the Secretary of the Navy Filed Jan. 23, 1960, Ser. No. 5,318
4 Claims. (Cl. 331—13)
(Granted under Title 35, U.S. Code (1952), sec. 266)

The invention described herein may be manufactured and used by or for the Government of the United States of America for governmental purposes without the payment of any royalties thereon or therefor.

This invention relates to a signal control system and in particular to one for controlling the frequency and phase of an oscillator over a wide band of operation.

In the prior art, there are arrangements for comparing the frequency of a standard source with that of an oscillator, developing an error signal in dependency upon the difference in frequency, and applying the error signal to the oscillator to correct the frequency of the same. These arrangements, in general, function properly over only a narrow range of frequency difference between standard source and oscillator. The systems that obtain correction over a wider range by employing a servo-circuit for course and an electrical circuit for fine correction do not adjust for both phase and frequency. Since the error signal may bring the source and oscillator into frequency synchronization but not into proper phase relationship, frequency lock may be accomplished with a phase displacement that unbalances the comparing means and gives rise to an error signal. If the standard source is removed under these conditions, the oscillator will revert to its previous uncorrected frequency so that arrangements of this type may not be used in systems wherein the error signal is applied and then quickly removed from the oscillator.

Accordingly, it is an object of the present invention to provide a system for correcting the phase and frequency shift of an oscillator.

Another object is to provide a system wherein the frequency and phase of an oscillator may be synchronized with that of a standard source in a comparison circuit that has a large pull in range.

These objects are accomplished by applying the outputs of a standard source and oscillator to a comparator and employing the output of the comparator in one of three control loops. When the difference in frequency between source and oscillator is great, the output of the comparator is an A.C. signal which, conducted to an A.C. control unit, energizes a circuit that controls a D.C. servo control unit. This narrows the range in frequency difference between oscillator and source to the point where the output of the comparator is a D.C. signal. The D.C. signal is then fed to an electrical control unit which synchronizes the frequency and to a servo control unit which reduces the phase displacement between the oscillator and source frequencies to a minimum.

Figure 1:
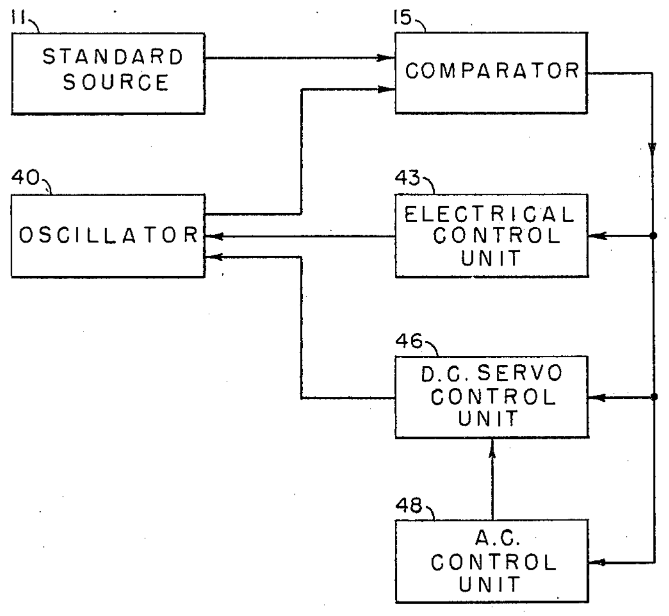
FIG. 1 is a block diagram of one embodiment of the present invention.
Figure 2:
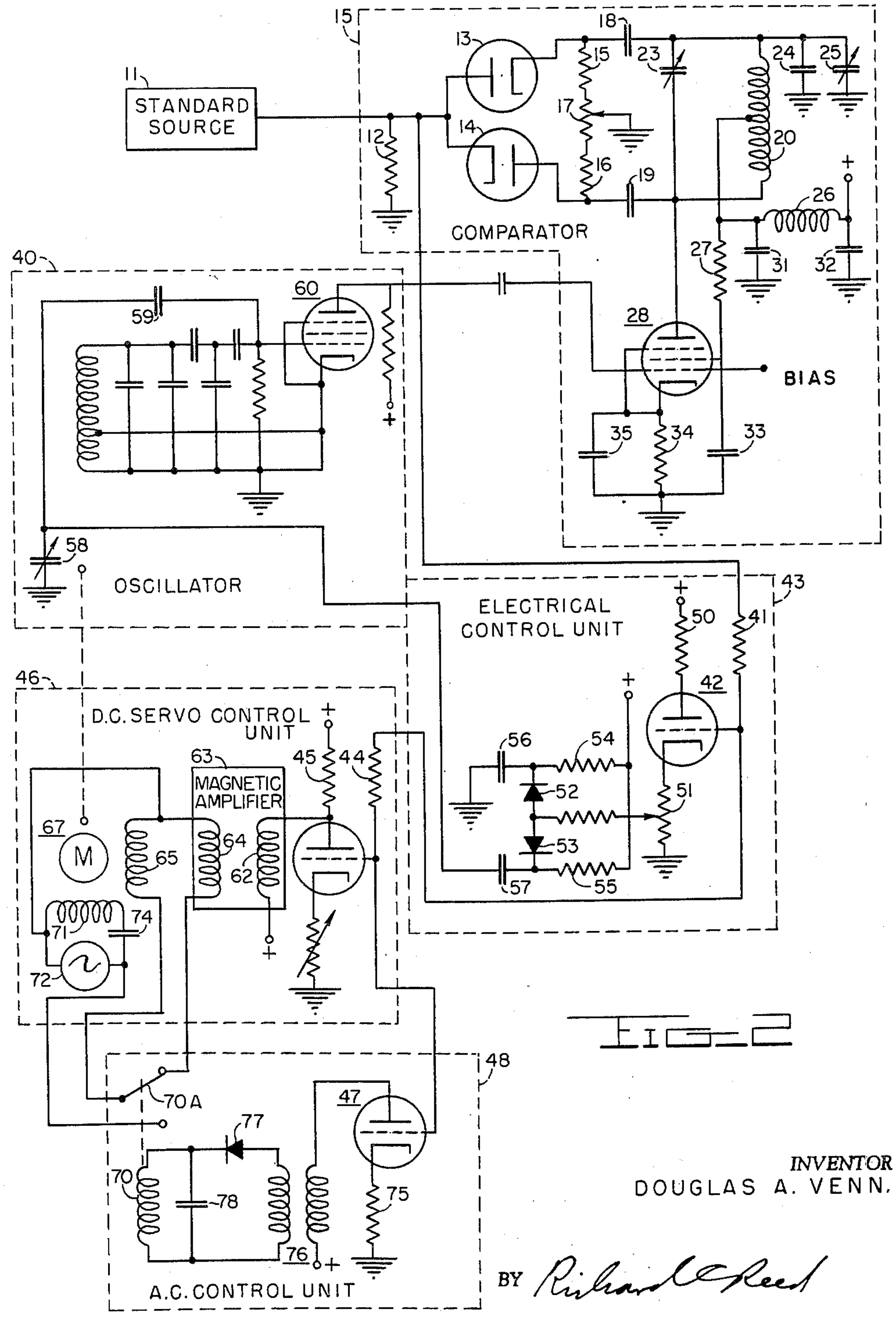
FIG. 2 is a circuit diagram of a portion of the embodiment disclosed in FIG. 1.

Referring to FIGS. 1 and 2, the output of standard source 11 is applied across resistor 12 which is connected to the plate of diode 13 and the cathode of diode 14 in comparator 15. Resistors 15, 16 and variable resistor 17 are connected in series and across the cathode and plate of diodes 13, 14. Likewise, capacitors 18, 19 and coil 20 are connected in series across the cathode and plate of the diodes. Variable capacitor 23 is positioned across coil 20 and capacitor 24, variable capacitor 25 are each connected across coil 20 to ground. Positive potential is applied through coil 26 and the center tap of coil 20 to the cathode of diode 13 and the plate of diode 14 as well as through resistor 27 to the screen grid of electron tube 28. Capacitors 31, 32 are each located across one side of coil 26 and ground. The screen grid of electron tube 28 is grounded through capacitor 33, the suppressor grid is connected to the cathode which is grounded through resistor 34 and the plate is connected to capacitors 19, 23. Capacitor 35 is positioned across resistor 34.

The output of comparator 15 is applied through resistor 41 to the control grid of electron tube 42 in electrical control unit 43, through resistor 44 to the control grid of electron tube 45 in D.C. servo control unit 46 and to the control grid of electron tube 47 in A.C. control unit 48. The plate of electron tube 42 is connected to positive potential through resistor 50 and the cathode is grounded through variable resistor 51.

Diodes 52 and 53, connected back to back, are variable capacitance silicon diodes. Positive potential is applied through resistor 54 to the cathode of diode 52 and resistor 55 to the cathode of diode 53. The cathode of diode 52 is connected to ground through capacitor 56 and the cathode of diode 53 is grounded through capacitor 57 and variable capacitor 58. The anodes of the diodes are connected to the center tap of variable resistor 51. A terminal located between variable capacitor 58 and capacitor 57 is connected through capacitor 59 to the control grid of electron tube 60 which is located in oscillator 40, one type of a variety conventional oscillator. The plate of electron tube 60 is connected to the control grid of electron tube 28 in comparator 15.

Control winding 62 of magnetic amplifier 63 is connected between the plate of electron tube 45 and a source of positive potential. The output winding 64 of the amplifier is connected across a first field winding 65 of gear reduction motor 67 when relay 70 is deenergized and the position of relay contacts 70A are in the position shown in FIG. 2. The motor may be a two phase induction motor. When relay 70 is energized and the contacts are in the lower position in FIG. 2, the first field winding is supplied with alternating current from source 72 and a second field winding 71 is supplied with alternating current from the source through capacitor 74 so that the current in winding 65 will be in phase quadrature with the current in field winding 71. The output shaft of motor 67 is mechanically coupled to variable capacitor 58 by an arrangement indicated schematically by a dotted line. In A.C. control unit 48, the cathode of electron tube 47 is connected to ground through resistor 75 and the plate to a source of positive potential through the primary of transformer 76. Relay 70 and diode 77 are connected in series across the secondary of the transformer while smoothing capacitor 78 is positioned across the relay. In the operation of the embodiment disclosed in FIGS. 2 and 3, the output frequencies of standard source 11 and oscillator 40 are applied to comparator 15. When the difference in frequency between the source and oscillator is great, the output of comparator 15 is an A.C. signal which, conducted to A.C. control unit 48, is amplified by electron tube 47 and rectified by diode 77 to energize relay 70. Contacts 70A are moved to the lower position in FIG. 2 so that A.C. current is applied to field winding 65 to energized gear reduction motor 67 which drives the capacitor 58 through the mechanical coupling represented in the drawing as a dotted line. This narrows the range in frequency difference between the outputs of oscillator 40 and standard source 11 to the area where the output of comparator 15 is a D.C. error signal. The latter is fed to the control grid of electron tube 52 in electrical control unit 43. Variations in the output voltage of the electron tube due to variations in the magnitude of the error signal effect a change in the capacity of diodes 52, 53 electrically tuning oscillator 40. If the original unbalance voltage in comparator 15 is of the correct sense, and it can be made so, the oscillator frequency will be corrected in the proper direction to come into synchronization with the frequency standard source 11 but not necessarily into proper phase relationship for balance in the comparator. Thus, frequency lock may be accomplished immediately but with a phase displacement unbalancing comparator 15 and giving rise to an error signal on the grid of electron tube 42. If the frequency of standard source 11 were removed under these conditions, oscillator 40 would revert to its uncorrected previous frequency.

In order to make the change permanent, i.e., until the next change is needed, the D.C. signal is applied to the control grid of electron tube 45 in D.C. servo control unit 46. The output of electron tube 45 is supplied to magnetic amplifier 63 which provides a voltage that rotates motor 67 in a direction that is dependent upon the polarity of the D.C. signal applied to the electron tube. The motor applies a cumulative long term corection to the oscillator by mechanically adjusting the setting of variable capacitor 58 during each disciplining period which brings the outputs of oscillator 40 and standard source 11 into the same phase relationship.

The combination of the two servo links, electrical or instantaneous but temporary correction and mechanical for cumulative correction provides a continuing integration of the correction applied to oscillator 40 even though the oscillator is used in a control system where the sampling of the error signal or discipline period is exceedingly short and is limited only by the speed of operation of the servomechanism. Thus, the servo links function as an electrical ratchet permitting the removal of the error signal after a short period of its application without reversion of oscillator 40 to its previous uncorrected state.

Obviously many modifications and variations of the present invention are possible in the light of the above teachings. It is therefore to be understood that within the scope of the appended claims, the invention may be practiced otherwise than as specifically described.

What is claimed is:

1. In a frequency control system, comparing means for providing an output comprising an alternating potential whose frequency depends upon the frequency difference between two applied signals when said frequency difference is outside a predetermined range and a direct potential having a magnitude and polarity dependent upon the frequency and phase displacement between applied signals when said frequency difference is within the predetermined range, signal generating means for providing a desired frequency including a tank circuit having at least a mechanically controlled reactance and an electrically controlled reactance, a standard source providing a reference frequency, means for applying said reference frequency and said desired frequency to said comparing means, a motor including a field winding coupled to said mechanically controlled reactance, a source of potential, first means responsive to said alternating potential for applying said source of potential across said field winding, a magnetic amplifier, means for applying the output of said magnetic amplifier across said field winding, and means for applying the output of said comparing means to said first means, to the input of said magnetic amplifier and to said electrically controlled reactance.

2. In a frequency control system, signal generating means for providing an output signal of desired frequency including a tank circuit having at least first and second variable reactance elements with at least said first reactance mechanically variable; a standard signal source adapted to provide a signal of reference frequency; a comparing means for comparing two applied signals having an output signal with a first component representative of the frequency difference between said two applied signals, a second component representative of the frequency difference between said two applied signals and a third component representative of the phase difference between said two applied signals; means for applying the output of said signal generating means and the output of said standard signal source to said comparing means; said first reactance element including motor means for mechanically varying said first reactance element including first and second motor control means; means adapted to control the rate of variation of said first reactance element at first and second rates, respectively connecting the output of said comparing means to said second motor control means such that said second motor control means is responsive to said second component in the output thereof; switching means for connecting said first and second motor control means to said motor in alternate order; means conecting the output of said comparing means to said switching means such that said switching means is responsive to said first component in the output thereof and is operative to connect said first motor control means to said motor when said first component is representative of a frequency difference greater than a selected minimum frequency difference; and means connecting the output of said comparing means to said second variable reactance element such that said second variable reactance is responsive to said third component in the output of said comparing means.

3. The structure as defined in claim 2 wherein said first component in the output of said comparing means is a frequency component.

4. The structure as defined in claim 3 wherein said second component is a direct current component of significant magnitude and polarity.

References Cited in the file of this patent

UNITED STATES PATENTS

| | | |
|---|---|---|
| 2,605,425 | Hugenholtz | July 29, 1952 |
| 2,762,922 | Lax | Sept. 11, 1956 |
| 2,794,920 | Salmet | June 4, 1957 |